United States Patent
Kimura et al.

[11] Patent Number: 5,547,349
[45] Date of Patent: Aug. 20, 1996

[54] OIL PUMP SYSTEM

[75] Inventors: Ichiro Kimura, Nagoya; Hisashi Miyazaki, Anjo, both of Japan

[73] Assignee: Aisin Seiki Kabushiki Kaisha, Kariya, Japan

[21] Appl. No.: 519,646

[22] Filed: Aug. 25, 1995

[30] Foreign Application Priority Data

Aug. 25, 1994 [JP] Japan ................................. 6-200579
Aug. 24, 1995 [JP] Japan ................................. 7-215699

[51] Int. Cl.$^6$ ...................................................... F04C 2/14
[52] U.S. Cl. ........................ 417/282; 417/286; 417/310
[58] Field of Search .................................. 417/310, 286, 417/282

[56] References Cited

U.S. PATENT DOCUMENTS

| | | | |
|---|---|---|---|
| 2,655,109 | 10/1953 | Walker | 417/286 |
| 3,951,575 | 4/1976 | Motomura et al. | 417/286 X |
| 4,838,767 | 6/1989 | Ohe et al. | 417/310 X |
| 5,199,854 | 4/1993 | Aoyama | 417/282 |
| 5,226,802 | 7/1993 | Nakamura et al. | 417/310 X |

FOREIGN PATENT DOCUMENTS

| | | |
|---|---|---|
| 3837599 | 5/1990 | Germany. |
| 6123485 | 2/1986 | Japan. |
| 2221692 | 9/1990 | Japan. |

Primary Examiner—Richard E. Gluck
Attorney, Agent, or Firm—Oblon, Spivak, McClelland, Maier & Neustadt, P.C.

[57] ABSTRACT

An oil pump system includes an oil pump, a first hydraulic passage, a second hydraulic passage, a return hydraulic passage, and a control valve. When a revolving speed of a rotor of the oil pump is low, and when a hydraulic pressure of a hydraulic oil, discharged out of a first outlet port of the oil pump to the first hydraulic passage, is lower than a predetermined value, a valve body of the control valve is placed at a first position, thereby joining the hydraulic oil, flowing in the first hydraulic passage, with the hydraulic oil, discharged out of a second outlet port of the oil pump to the second hydraulic passage, and delivering the thus joined hydraulic oil to a hydraulic oil receiving unit via a hydraulic-oil-delivery passage. When the revolving speed of the rotor is high, and when the hydraulic pressure of the hydraulic oil, discharged out of the first outlet port to the first hydraulic passage, is higher than the predetermined value, the valve body is placed at a second position, thereby inhibiting the hydraulic oil from joining, and delivering only the hydraulic oil, discharged out of the first outlet port to the first hydraulic passage, to the aforementioned destination. The oil pump system is downsized and lightweighted advantageously, and is improved in terms of work efficiency and on-boardability.

13 Claims, 6 Drawing Sheets

OIL PUMP SYSTEM

BACKGROUND OF THE INVENTION

1. Field of the Invention

The present invention relates to an oil pump system. In particular, the present invention is applicable to an oil pump system which exhibits an increasing hydraulic-pressure characteristic; namely: it produces an increasing hydraulic pressure as a revolving speed of a driving source, e.g., a crankshaft of an internal combustion engine of a vehicle, increases.

2. Description of Related Art

In oil pump systems, when a revolving speed of their rotor increases, a hydraulic oil is discharged out of an outlet port in an increasing outlet amount. As a result, oil pump systems produce an increasing hydraulic pressure.

Heretofore, as disclosed in Japanese Unexamined Utility Model Publication (KOKAI) No. 61-23,485, a conventional oil pump system has been known. This conventional oil pump system is provided with two gear pumps which are disposed integrally therein. In the conventional oil pump system, two gear pumps are actuated in order to securely discharge a hydraulic oil in a predetermined outlet amount in low revolving-speed region where a hydraulic pressure is likely to be low. Thus, the oil pump system securely produces a required hydraulic pressure. On the other hand, only one of the two gear pumps is actuated in high revolving-speed region because an outlet amount is increased so large that hydraulic-pressure increment can be expected. Thus, the oil pump system is inhibited from producing a hydraulic pressure more than required, and thereby its work efficiency is improved.

Further, another conventional oil pump system has been known so far. As illustrated in FIG. 10, this conventional oil pump system is provided with a relief valve 300. The oil pump system is further provided with a pump body 100 which includes an inlet port 101 and an outlet port 102, and a rotor 200 which is disposed rotatably in a pump chamber 105 of the pump body 100 and which has a plurality of teeth. The relief valve 300 is actuated in responsive to a hydraulic pressure in a hydraulic oil which is discharged out or the outlet port 102.

Similarly to the first conventional oil pump system, when the revolving speed of the rotor 200 is increased, the hydraulic oil is discharged out of the outlet port 102 in an increasing amount in this conventional oil pump system as well. When the revolving speed of the rotor 200 is increased to produce a hydraulic pressure of a reference pressure $P_1$ or more, the hydraulic pressure of the hydraulic oil discharged out of the outlet port 102 overcomes the urging force of the relief valve 300, and thereby the relief valve 300 is actuated to open. Accordingly, the excessive hydraulic oil is discharged to the outside via a relief port of the relief valve 300.

Furthermore, the conventional oil pump system disclosed in Japanese Unexamined Utility Model Publication (KOKAI) No. 61- 23,485 requires two gear pumps. Accordingly, it is disadvantageous from the downsizing point of view, and it is unfavorable in terms of on-boardability when boarding it on carriers like vehicle bodies.

Moreover, in accordance with the conventional oil pump system illustrated in FIG. 10, when a hydraulic pressure of the reference pressure $P_1$ or more is produced, the relief valve 300 is actuated to open by the hydraulic pressure of the hydraulic oil delivered out of the outlet port 102, and the excessive hydraulic oil is discharged to the outside as described above. Consequently, the excessive hydraulic oil discharged to the outside is also subjected to a large hydraulic pressure of the reference pressure $P_1$ or more, and accordingly the conventional oil pump system carries out to produce an excessive work. Thus, this conventional oil pump system is not favorable in terms of work efficiency.

SUMMARY OF THE INVENTION

The present invention has been developed in view of the aforementioned circumstances. It is therefore an object of the present invention to provide an oil pump system which employs means fop returning an excessive hydraulic oil to its inlet port without applying a large pressure to the discharged excessive hydraulic oil when the revolving speed of its rotor is increased to securely produce a specified hydraulic pressure. The returning means can return the excessive hydraulic oil directly to the inlet port, or it can return the hydraulic oil by way of a hydraulic oil reservoir. An oil pump system according to the present invention enables to improve work efficiency, and thereby it contributes to advantageously reducing driving horsepower of its oil pump. Moreover, the present oil pump system is downsized beneficially, and thereby it can be enhanced in terms of on-boardability when it is boarded on carriers like vehicle bodies.

In one aspect of the present invention, an oil pump system comprises:

an oil pump including:
  a pump body defining a pump chamber therein;
  a rotor rotated by a driving source in the pump body;
  an inlet port sucking a hydraulic oil into the pump chamber as the rotor rotates; and
  an outlet port array having a first outlet port and a second outlet port at least, the first and second outlet ports discharging the hydraulic oil out of the pump chamber as the rotor rotates;
a first hydraulic passage connecting a hydraulic-oil-delivery passage with the first outlet port of the oil pump, and delivering the hydraulic oil, coming from the first outlet port, to the hydraulic-oil-delivery passage, the hydraulic-oil-delivery passage delivering the hydraulic oil to a hydraulic oil receiving unit;
a second hydraulic passage connecting the hydraulic-oil-delivery passage with the second outlet port of the oil pump, and delivering the hydraulic oil, coming from the second outlet port, to the hydraulic-oil-delivery passage; and
a return hydraulic passage connected to the second hydraulic passage, and communicated with the inlet port of the oil pump; and
a control valve connected to the first hydraulic passage, the second hydraulic passage and the return hydraulic passage, the control valve including a valve body actuated in accordance with a hydraulic pressure of the hydraulic oil within the first hydraulic passage, and the control valve being capable of switching the valve body between a first position and a second position;
the first position joining the first hydraulic passage and the second hydraulic passage so as to join the hydraulic oil flowing in both of them, and delivering the joined hydraulic oil to the hydraulic-oil-delivery passage when the hydraulic pressure in the first hydraulic passage is lower than a predetermined value;

the second position preventing the first hydraulic passage and the second hydraulic passage from joining, delivering the hydraulic oil flowing in the first hydraulic passage to the hydraulic-oil-delivery passage, and returning the hydraulic oil flowing in the second hydraulic passage to the return hydraulic passage when the hydraulic pressure in the first hydraulic passage is higher than the predetermined value.

In another aspect of the present invention, an oil pump system comprises:

an oil pump including:
a pump body defining a pump chamber therein;
a rotor rotated by a driving source in the pump body;
an inlet port sucking a hydraulic oil into the pump chamber as the rotor rotates; and
an outlet port array having a first outlet port and a second outlet port at least, the first and second outlet ports discharging the hydraulic oil out of the pump chamber as the rotor rotates;

a first hydraulic passage connecting a hydraulic-oil-delivery passage with the first outlet port of the oil pump, and delivering the hydraulic oil, coming from the first outlet port, to the hydraulic-oil-delivery passage, the hydraulic-oil-delivery passage delivering the hydraulic oil to a hydraulic oil receiving unit;

a second hydraulic passage connecting the hydraulic-oil-delivery passage with the second outlet port of the oil pump, and delivering the hydraulic oil, coming from the second outlet port, to the hydraulic-oil-delivery passage; and a return hydraulic passage connected to the second hydraulic passage, and communicated with the inlet port of the oil pump;

control means for outputting a control signal in responsive to at least one of a hydraulic-oil pressure in the first hydraulic passage, a hydraulic-oil temperature, an opening degree of a throttle valve, and a revolving speed of the driving source; and a control valve connected to the first hydraulic passage, the second hydraulic passage and the return hydraulic passage, the control valve including a valve body actuated in accordance with the control signal outputted by the control means, and the control valve being capable of switching the valve body between a first position and a second position;

the first position joining the first hydraulic passage and the second hydraulic passage so as to join the hydraulic oil flowing in both of them, and delivering the joined hydraulic oil to the hydraulic-oil-delivery passage when the hydraulic pressure in the first hydraulic passage is lower than a predetermined value;

the second position preventing the first hydraulic passage and the second hydraulic passage from joining, delivering the hydraulic oil flowing in the first hydraulic passage to the hydraulic-oil-delivery passage, and returning the hydraulic oil flowing in the second hydraulic passage to the return hydraulic passage when the hydraulic pressure in the first hydraulic passage is higher than the predetermined value.

In the present oil pump system, when a required hydraulic pressure is produced securely in the first hydraulic passage, the return hydraulic passage can be a passage which is adapted for returning the excessive hydraulic oil directly to the inlet port of the oil pump, or which is adapted for returning the excessive hydraulic oil by way of the hydraulic oil storing unit. Accordingly, the return hydraulic passage can communicate the second hydraulic passage with the inlet port of the oil pump directly, thereby returning the hydraulic oil, flowing in the second hydraulic passage, to the inlet port. Alternatively, the return hydraulic passage can communicate the second hydraulic passage with the inlet port of the oil pump by way of the hydraulic oil storing unit, such as an oil pan, a reservoir, and an oil tank, thereby returning the hydraulic oil, flowing in the second hydraulic passage, to the inlet port via the hydraulic oil storing unit.

The term "hydraulic oil receiving unit" herein means a device to which the hydraulic oil is delivered from the hydraulic-oil-delivery passage. For instance, the hydraulic oil receiving unit can be a lubricating device like a bearing, an oil-cooled device like a cylinder or a piston of an internal combustion engine, or an hydraulically-operated actuator.

In the present oil pump system, the revolving speed of the rotor increases as the revolving speed of the driving source increases, and the amount of the hydraulic oil discharged out of the first outlet port increases. Thus, the hydraulic pressure increases in the first hydraulic passage.

When the revolving speeds of the driving source and the rotor are low, and when the hydraulic pressure in the first hydraulic passage is lower than a predetermined value $P_m$, the valve body of the control valve is placed at the first position, thereby joining the hydraulic oil, flowing in the first hydraulic passage, with the hydraulic oil, flowing in the second hydraulic passage. The thus joined hydraulic oil is delivered to the hydraulic-oil-delivery passage. As a result, even when the revolving speed of the rotor is low, the required hydraulic oil can be delivered to the hydraulic oil receiving unit securely.

On the other hand, when the revolving speed of the rotor increases to enlarge the amount of the hydraulic oil discharged out of the first outlet port, and when the hydraulic pressure in the first hydraulic passage is higher than the predetermined value $P_m$, the valve body of the control valve is placed at the second position, thereby preventing the above-described joining of the hydraulic oils from happening. As a result, the hydraulic oil, flowing in the first hydraulic passage, is delivered to the hydraulic-oil-delivery passage, but the hydraulic oil, flowing in the second hydraulic passage, is returned to the return hydraulic passage.

To put it differently, when the revolving speeds of the driving source and the rotor increase to enlarge the amount of the hydraulic oil discharged out of the first outlet port, and when the hydraulic pressure is higher than the predetermined value $P_m$ in the first hydraulic passage so that the first hydraulic passage alone can securely produce the required hydraulic pressure, it is unnecessary to enlarge the hydraulic pressure by joining the hydraulic oils as aforementioned. Consequently, the excessive hydraulic oil is returned to the inlet port by way of the return hydraulic passage. Note that the excessive hydraulic oil is discharged to the second hydraulic passage out of the second outlet port, and that it can be returned to the inlet port directly, or to the inlet port by way of the oil storing unit.

Thus, the excessive hydraulic oil is inhibited from being delivered to the hydraulic-oil-delivery passage, and it is returned to the return hydraulic passage from the second hydraulic passage. Accordingly, the excessive hydraulic oil is not subjected to a large hydraulic pressure. Hence, when the required hydraulic pressure is produced securely by the first hydraulic passage alone, the present oil pump system can reduce excessive work, or it can keep it from arising. All in all, the horsepower can be reduced for driving the present oil pump system.

Moreover, when the required hydraulic pressure is produced securely by the first hydraulic passage only, the excessive work can be canceled so that the present oil pump system is upgraded in terms of work efficiency, and that it distinguishes over the conventional oil pump system disclosed in Japanese Unexamined Utility Model Publication (KOKAI) No. 61-23,485. For instance, the present oil pump system can get rid of the two-integrally-provided-oil-pump arrangement of the conventional oil pump system. Thus, the present invention can advantageously contribute to downsizing conventional oil pump systems as well as reducing their weight, and eventually it can beneficially improve their on-boardability when they are boarded on carriers like vehicle bodies.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

An oil pump system according to the present invention will be hereinafter described with reference to a First Preferred Embodiment thereof. The First Preferred Embodiment is adapted for boarding on a vehicle, and it is actuated by an internal combustion engine to produce a hydraulic pressure.

Figure 1:
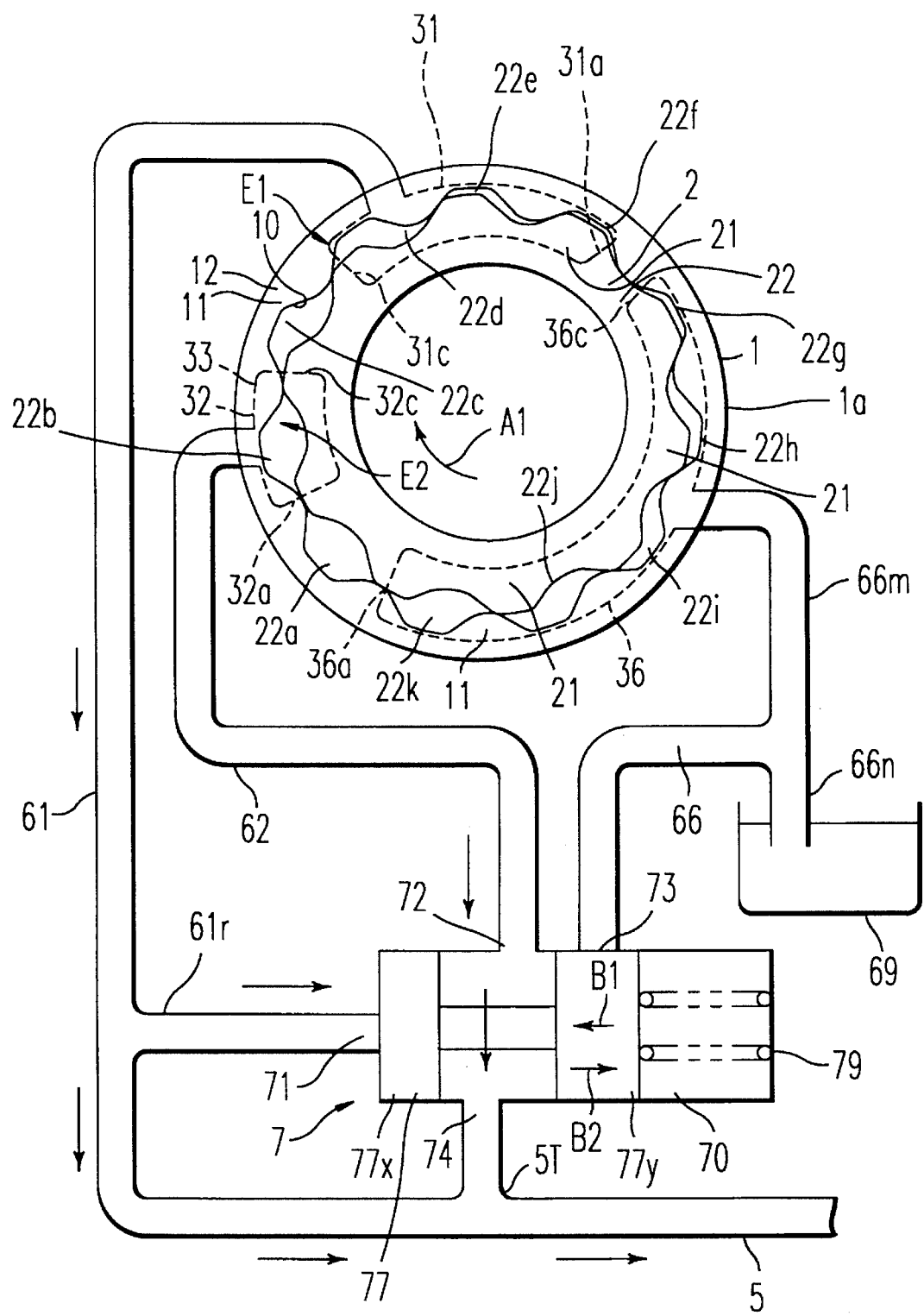
FIG. 1 illustrates an arrangement of a First Preferred Embodiment or an oil pump system according to the present invention whose rotor is rotated at a low revolving speed.

FIG. 1 illustrates a conceptual arrangement of the oil pump system. As illustrated in FIG. 1, an oil pump 1 or the oil pump system is provided with a pump body 1a which is made of metal, such as an aluminum-based alloy and an iron-based alloy. In the pump body 1a, a pump chamber 10 is formed. In the pump chamber 10, an internal gear member 12 is formed which is provided with a plurality of internal gear teeth 11 so as to constitute a driven gear. Further, in the pump chamber 10, a rotor 2 made of metal is disposed rotatably therein. The rotor 2 is connected to a crankshaft of an internal combustion engine which constitutes a driving source, and it is rotated together with the crankshaft. In general, the rotor 2 is designed to rotate at a revolving speed of from 600 to 7,000 rpm.

On an outer periphery of the rotor 2, an outer gear member 22 is formed which is provided with a plurality of outer gear teeth 21 so as to constitute a driving gear. Note that the internal gear teeth 11 and the outer gear teeth 21 are defined by a trochoid curve.

The rotor 2 is rotated in the direction of the arrow "A1" of FIG. 1. As the rotor 2 is rotated, the outer gear teeth 21 of the rotor 2 are meshed with the internal gear teeth 11 one after another, and accordingly the internal gear member 12 is rotated in the same direction. Between the outer gear teeth 21 and the internal gear teeth 11, there are formed spaces 22a through 22k as illustrated in FIG. 1. In FIG. 1, the space 22a has the largest volume in the spaces 22a through 22k, and the space 22f has the smallest volume therein.

The spaces 22b through 22f, disposed downstream with respect to the space 22a, produce an outlet pressure, because their volume is diminished as the rotor 2 is rotated, and they act to discharge a hydraulic oil. The spaces 22f through 22k, disposed upstream with respect to the space 22a, produce an inlet pressure, because their volume is enlarged as the rotor 2 is rotated, and they act to suck the hydraulic oil.

In the pump body 1a of the oil pump 1, a outlet port array 33 is formed. The outlet port array 33 is provided with a main outlet port 31 which operates as a first outlet port, and a sub outlet port 32 which operates as a second outlet port. The outlet port array 33 is adapted to discharge the hydraulic oil out of the pump chamber 10 as the rotor 2 is rotated. The main outlet port 31 is provided with end sides 31a, 31c. The sub outlet port 32 is provided with end sides 32a, 32c. Further, in the pump body 1a of the oil pump 1, an inlet port 36 is formed as well. The inlet port 36 is adapted to suck the hydraulic oil into the pump chamber 10 as the rotor 2 is rotated. The inlet port 36 is provided with end sides 36a, 36c.

In the First Preferred Embodiment, the main outlet port 31 is disposed downstream with respect to the sub outlet port 32 in the rotary direction of the rotor 2 designated at the arrow "A1." The opening area of the main outlet port 31 is designed so that it is larger than the opening area of the sub outlet port 32. As can be appreciated from FIG. 1, the contact points "E1," "E2" between the internal gear teeth 11 and the outer gear teeth 21 are positioned between the main outlet port 31 and the sub outlet port 32. Accordingly, the main outlet port 31 and the sub outlet port 32 are not communicated with each other along the peripheral direction of the pump chamber 10. Thus, the main outlet port 31 and the sub outlet port 32 are adapted to discharge the hydraulic oil independently of each other.

A hydraulic-oil-delivery passage 5 is a passage which is adapted for delivering a hydraulic pressure of the hydraulic oil to a hydraulic oil receiving unit. Generally speaking, the hydraulic oil receiving unit can be a lubricating device like a bearing which requires supply of a hydraulic oil, a valve mechanism of an internal combustion engine, or an actuator mechanism, such as a cylinder and a piston, of an internal combustion engine.

A first hydraulic passage 61 is a passage which connects the main outlet port 31 with the hydraulic-oil-delivery passage 5. Thus, it functions to deliver the hydraulic oil discharged out of the main outlet port 31 to the hydraulic-oil-delivery passage 5.

A second hydraulic passage 62 is a passage which connects the hydraulic-oil-delivery passage 5 with the sub outlet port 32. Thus, it functions to deliver the hydraulic oil discharged out of the sub outlet port 32 to the hydraulic-oil-delivery passage 5.

A return hydraulic passage 66 is a passage which is connected to the second hydraulic passage 62, and which is connected go the inlet port 36. Further, it is provided with a passage 66m which functions to return the hydraulic oil to the inlet port 36. In addition, 66n specifies a passage which functions to suck the hydraulic oil from an oil pan 69.

A control valve 7 is provided with a valve chamber 70, a first valve port 71, a second valve port 72, a return valve port 73, and a confluence port 74. The first valve port 71 is communicated with the first hydraulic passage 61 via an intermediate hydraulic passage 61r. The second valve port 72 is communicated with the second hydraulic passage 62. The return port 73 is communicated with the return hydraulic passage 66. The confluence port 74 is communicated with a confluence region ST. Note that a spool 77 (i.e., the valve body) is fitted into the valve chamber 70 of the control valve 7, and it is urged by a spring 79 in the direction of the arrow "B1" of FIG. 1.

Figure 4:
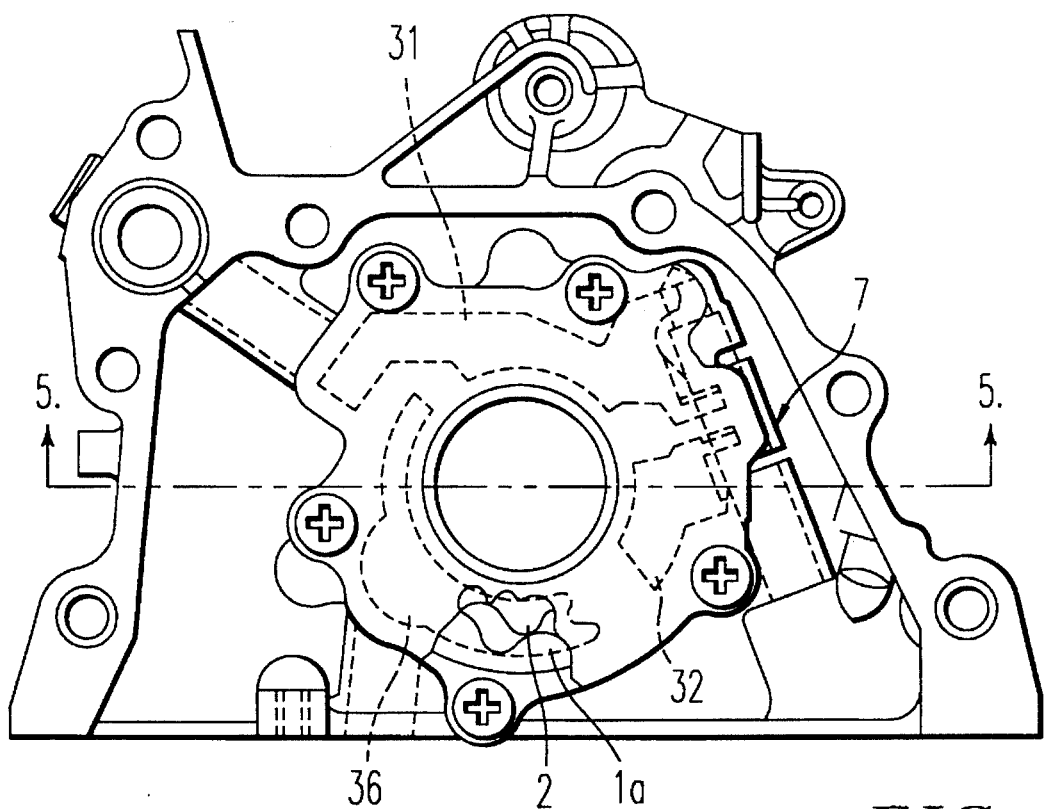
FIG. 4 illustrates a side view of a pump body of the First Preferred Embodiment of the present oil pump system, which is constructed actually.
Figure 5:
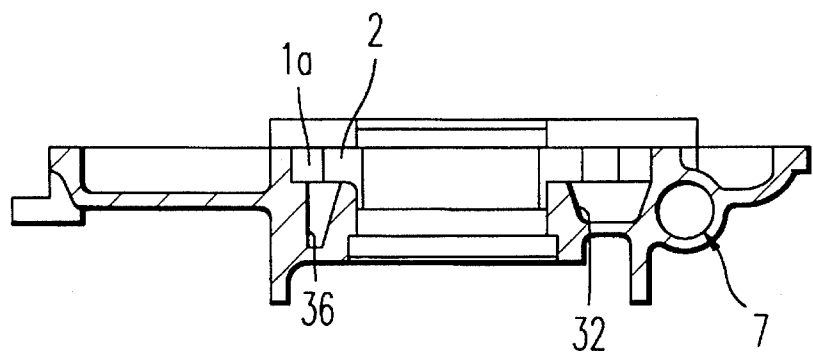
FIG. 5 is a cross-sectional view taken along arrow "5"—"5" of FIG. 4.

According to FIG. 1, which shows the conceptualized present oil pump system, the control valve 7 is connected to the outlet ports 31, 32 by way of the long first hydraulic passage 61, the long intermediate hydraulic passage 61r and the long second hydraulic passage 62. However, as illustrated in FIGS. 4 and 5 (e.g., a cross-sectional view taken along line "5"—"5" of FIG. 4), which shows an actual on-board design, the control valve 7 is disposed adjacent to the outlet ports 31, 32. Thus, the length of the hydraulic passages are designed to be short, thereby preventing the on-board space of an oil pump system from enlarging, inhibiting the weight thereof from increasing, and reducing the pressure loss in the hydraulic passages.

As can be appreciated from FIG. 1, in the thus constructed oil pump system, the hydraulic pressure of the hydraulic oil, discharged out of the main outlet port 31 to the first hydraulic passage 61, acts onto the spool 77 by way of the intermediate hydraulic passage 61r and the first valve port 71 of the control valve 7. Thus, a spool-actuating force "F1" is produced to actuate the spool 77. When the spool-actuating force "F1" is less than the urging force "F3" of the spring 79 (e.g., "F1"<"F3"), the spool 77 is moved by the spring 79 in the direction of the arrow "B1" of FIG. 1, and thereby it is placed at a first position. Specifically, a first spool portion 77x of the spool 77 closes the first valve port 71, and a second spool portion 77y thereof further closes the return port 73. At the same time, the spool 77 placed at the first position communicates the second valve port 72 with the confluence port 74.

Figure 2:
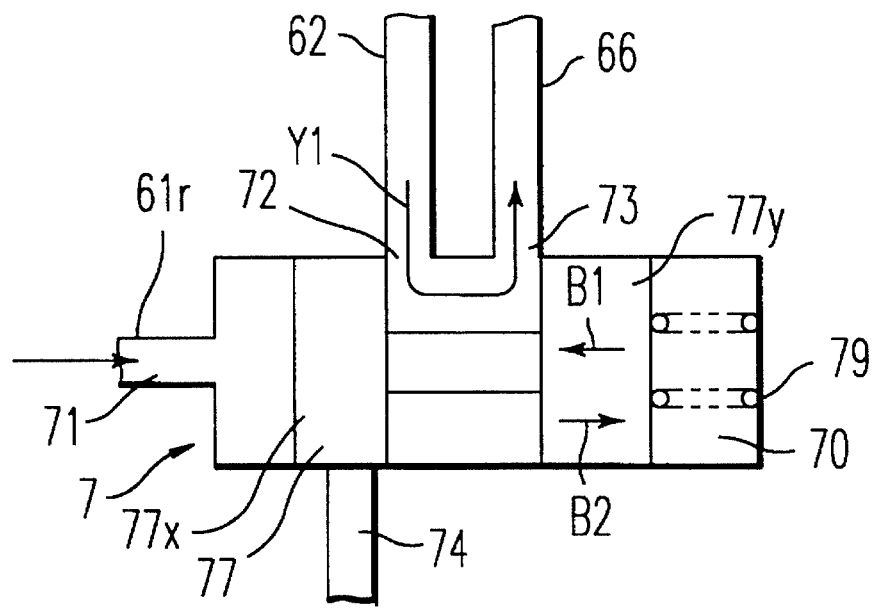
FIG. 2 illustrates an arrangement of the First Preferred Embodiment of the present oil pump system whose rotor is rotated at a high revolving speed.

On the other hand, when the spool-actuating force "F1" overcomes the urging force "F3" of the spring 79 (e.g., "F1">"F3"), the spool 77 is moved in the direction of the arrow "B2" of FIG. 1 until "F1" is in equilibrium with "F3," and thereby it is placed at a second position shown in FIG. 2.

Figure 3:
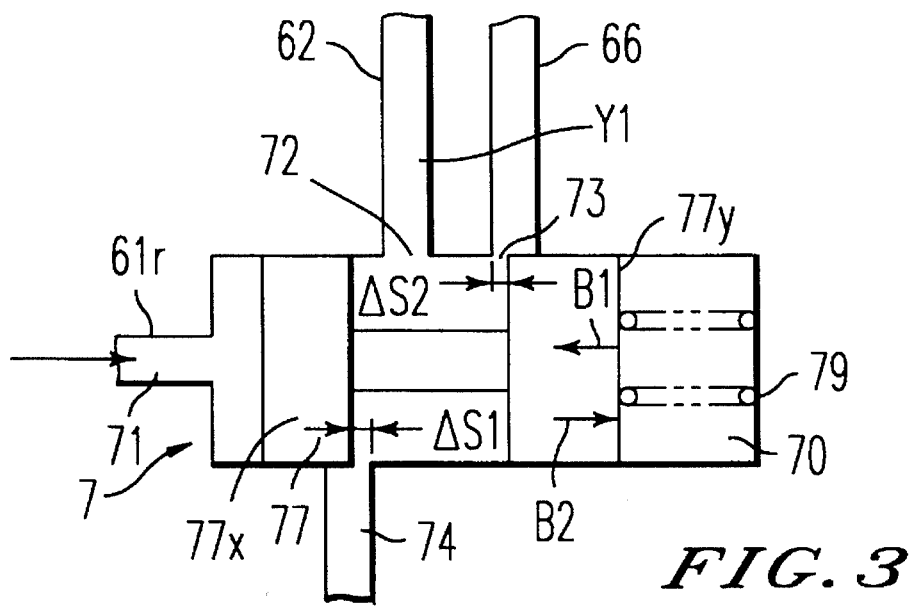
FIG. 3 illustrates an arrangement of the First Preferred Embodiment of the present oil pump system whose rotor is rotated at an intermediate revolving speed.

FIG. 3 illustrates the spool 77 of the control valve 7 is at an intermediate position on its way from the first position to the second position. As illustrated in the drawing, the spool 77 can be placed at an intermediate position where its first spool portion 77x opens the confluence port 74 by ΔS1 and simultaneously its second spool portion 77y opens the return port 73 by ΔS2. As can be understood from the drawing, when the spool 77 is placed at the intermediate portion, both of the second valve port 72 and the confluence port 74 communicate with the return port 73.

Operations of the First Preferred Embodiment of the present oil pump system will be hereinafter described. As the revolving speed of the crankshaft of the internal combustion engine (i.e., a driving source) increases, the revolving speed of the rotor 2 increases. Accordingly, there arises the following characteristics; namely: the amount of the hydraulic oil discharged out of the main outlet port 31 enlarges, and the hydraulic pressure enlarges in the first hydraulic passage 61. Likewise, the amount of the hydraulic oil discharged out of the sub outlet port 32 enlarges, and the hydraulic pressure enlarges in the second hydraulic passage 62.

When the revolving speed of the internal combustion engine is less than a predetermined revolving speed which can be determined as desired, for instance, 3,000 rpm, and when the revolving speed of the rotor 2 is low, the amount of the hydraulic oil discharged out of the main outlet port 31 is less. As a result, the hydraulic pressure in the first hydraulic passage 61 is lower than the predetermined value Pm, for example, Pm=5 kgf/cm$^2$. Under the circumstances, the relationship between the spool-actuating force "F1" and the urging force "F3" of the spring 79 is put into "F1"<"F3". Consequently, the spool 77 is urged by the spring 79 in the direction of the arrow "B1" of FIG. 1, and it closes the first valve port 71. Thus, the spool 77 of the control valve 7 is placed at the first position.

If such is the case, as can be appreciated from FIG. 1, the return port 73 is also closed, and at the same time the second valve port 72 is communicated with the confluence port 74. Accordingly, the hydraulic oil, coming from the second hydraulic passage 62, is flowed into the confluence region 5T by way of the second valve port 72 and the confluence port As a result, the hydraulic oil, coming from the first hydraulic passage 61, is joined with the hydraulic oil, coming from the second hydraulic passage 62, at the confluence region ST. Hence, the required hydraulic pressure is produced securely in the hydraulic-oil-delivery passage 5. Thus, even when the revolving speed of the internal combustion engine is low, the hydraulic pressure can be established sufficiently as required by means of the confluence.

On the other hand, when the revolving speed of the internal combustion engine is increased, for instance, to more than 3,000 rpm, the revolving speed of the rotor 2 is increased accordingly. Under the circumstances, the amount of the hydraulic oil discharged out of the main outlet port 31 is increased, and thereby the hydraulic pressure is increased to more than the predetermined value Pm in the first hydraulic passage 61. Eventually, the spool-actuating force "F1" is increased to overcome the urging force "F3" of the spring 79 (i.e., "F1">"F3"), and accordingly, as can be understood from FIG. 2, the spool 77 is moved in the direction of the arrow "B2" of FIG. 2 while contracting the spring 79 elastically. Thus, the spool 77 of the control valve 7 is placed at the second position. Specifically, the first spool portion 77x of the spool 77 closes the confluence port 74 to inhibit the aforementioned hydraulic-oil confluence, i.e., to inhibit the hydraulic oil, coming from the first hydraulic passage 61, from joining with the hydraulic oil, coming from the second hydraulic passage 62.

Moreover, as can be seen from FIG. 2, the spool 77 is placed at the second position so as to communicate the second valve port 72 with the return port 73. As a result, the hydraulic oil, coming from the second hydraulic passage 62, is returned to the return hydraulic passage 66 by way of the second valve port 72 and the return port 73 in the direction of the arrow "Y1" of FIG. 2. Then, the hydraulic oil thus returned to the return hydraulic passage 66 is lead to the passage 66m, and it is sucked directly into the inlet port 36.

As having been described so far, in the First Preferred Embodiment, when the revolving speeds of the internal combustion engine and the rotor 2 are increased so that the hydraulic pressure, resulting from the amount of the hydraulic oil discharged out the main outlet port 31, is more than the predetermined value Pm, and when a required hydraulic pressure is produced securely in the hydraulic-oil-delivery passage 5 only by the hydraulic oil coming from the first hydraulic passage 61. Thus, it is unnecessary to join the hydraulic oil, coming from the first hydraulic passage 61, with the hydraulic oil, coming from the second hydraulic passage 62. Hence, the excessive hydraulic oil, discharged out of the sub outlet port 32 to the second hydraulic passage 62, is returned to the inlet port 36 by way of the second valve port 72, the return port 73 and the return hydraulic passage 66.

Figure 6:
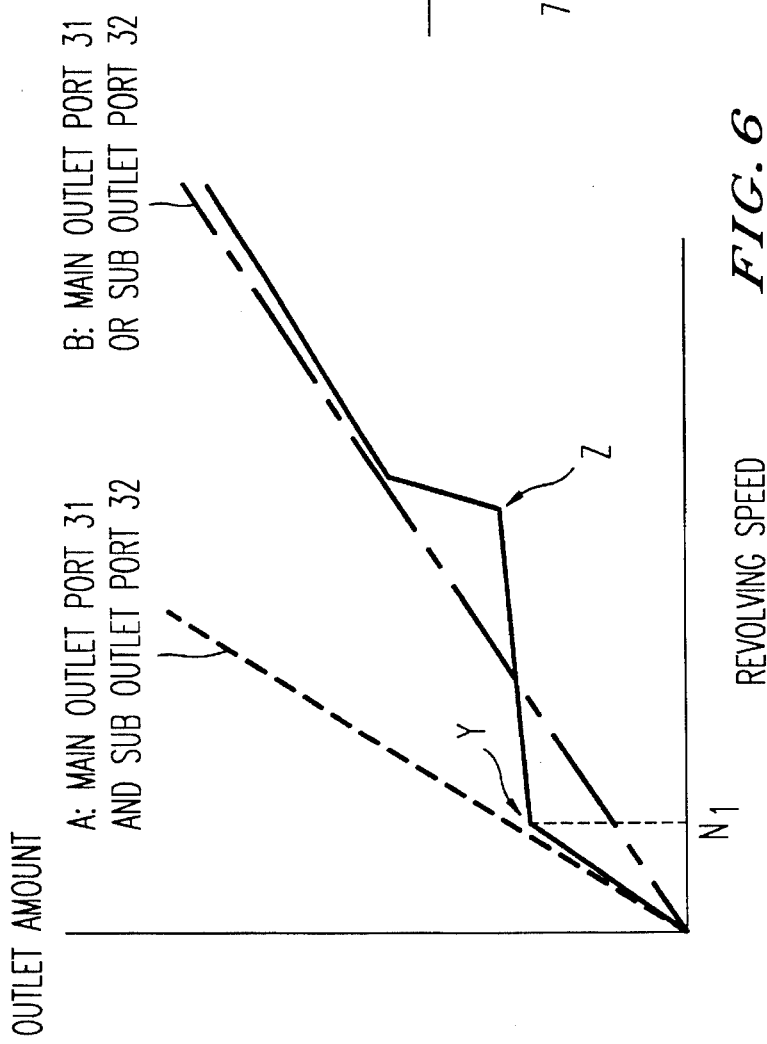
FIG. 6 illustrates an outlet-amount characteristic, which is exhibited by the First Preferred Embodiment of the present oil pump system.

FIG. 6 is a graph, which schematically illustrates the relationships between the revolving speeds of the internal combustion engine and the outlet amounts of the First Preferred Embodiment of the present oil pump system. The dotted line "A" of the drawing specifies the characteristic of the total outlet amounts, which are discharged from both of the main outlet port 31 and the sub outlet port 32. The alternate-long-and-dash line "B" of the drawing specifies the characteristic of the outlet amounts, which are discharged from the main outlet port 31, or which are discharged from the sub outlet port 32. In the First Preferred Embodiment, both of the main outlet port 31 and the sub outlet port 32 are designed to discharge the same outlet amount and to exhibit the same outlet-amount characteristic.

As shown by the solid line of FIG. 6, when the revolving speed of the internal combustion engine is less than a predetermined revolving speed $N_1$, the First Preferred Embodiment of the present oil pump system exhibits the outlet-amount characteristic, which is specified by the dotted line "A" of the drawing. Thus, it discharges the total outlet amount, in which the outlet amounts discharged from both of the main outlet port 31 and the sub outlet port 32 are joined together.

Further, after the revolving speed of the internal combustion engine exceeds the predetermined revolving speed $N_1$, or it goes beyond the point "Y" of FIG. 6, the spool 77 of the control valve is placed at the above-described intermediate position. Consequently, as illustrated in FIG. 3, both of the second valve port 72 and the confluence port 74 are communicated with the return port 73. As a result, the outlet amount is increased less with respect to the increment of the revolving speed.

Furthermore, when the revolving speed of the internal combustion engine is increased to the point "Z" of FIG. 6, the spool 77 of the control valve 7 closes the confluence port 74 so as to discommunicate the confluence port 74 and the return port 73 as illustrated in FIG. 2. Accordingly, the outlet amount is increased up to the point, which is specified by the alternate-long-and-dash line "B" of FIG. 6, and thereafter the outlet-amount characteristic is illustrated by the alternate-long-and-dash line "B". Note that the difference between the alternate-long-and-dash line "B" and the solid line results from the hydraulic-oil leakage or the like. Also note that the position of the point "Z" can be changed by varying the displacement distance, over which the spool 77 is moved to close the confluence port 74.

In short, in the First Preferred Embodiment having been described so far, when the required hydraulic pressure is produced securely only by the hydraulic oil coming from the first hydraulic passage, the excessive hydraulic oil coming from the second hydraulic passage 62 is returned directly to the return hydraulic passage 66 without being delivered to the hydraulic-oil-delivery passage 5. As a result, no large hydraulic pressure is applied to the excessive hydraulic oil. For example, the hydraulic pressure, applied to the excessive hydraulic oil, can be suppressed to as less as from 0.3 to 0.5 kgf/cm². Therefore, after the required hydraulic pressure is produced securely, extra work can be reduced or avoided, and thereby the horsepower for driving the oil pump 1 can be reduced. The reduction or avoidance of the extra can result in the reduction of the load against the oil pump 1, and accordingly it beneficially enables to downsize the oil pump 1 and reduce the weight thereof. All in all, in accordance with the First Preferred Embodiment, the oil pump 1 can be improved advantageously in terms of on-boardability when it is boarded on carriers like vehicle bodies.

Modified Version of the First Preferred Embodiment

Figure 7:
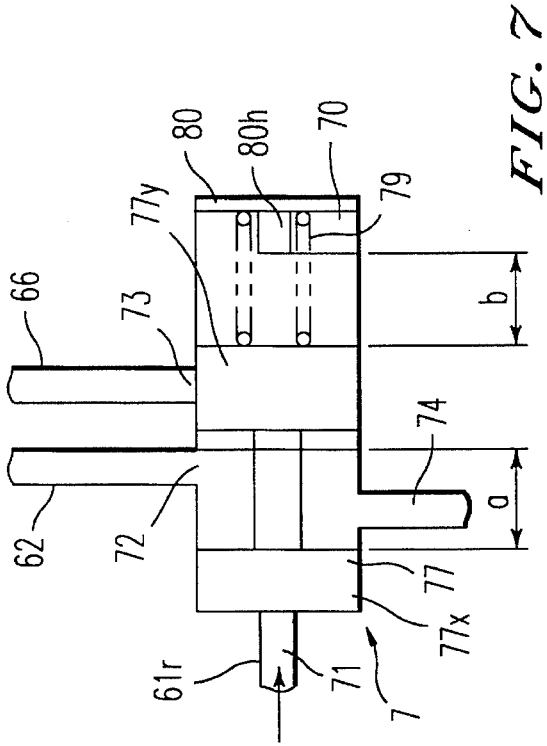
FIG. 7 illustrates an arrangement of a control valve, which is employed by a modified version of the First Preferred Embodiment of the present oil pump system.

FIG. 7 illustrates a modified version of the First Preferred Embodiment, which specifically is a modified construction of the control valve 7. In this modified construction, a plug 80 is disposed between a spring 79 and one of the opposite ends of the valve chamber 70. The plug 80 is provided with a projection 80h, which projects into the axial central space of the coiled spring As shown in FIG. 7, "a" designates the displacement distance, over which the spool 77 is moved to completely close the second valve port 72 with the first valve portion 77x, and "b" designates the displacement distance, over which the spool 77 is moved to bring the second valve portion 77y into contact with the projection 80h of the plug 80. Note that the length of the projection 80h is designed so that "a" is larger than "b" (i.e., "a">"b").

In the thus constructed modified version of the control valve 7, even when the spool 77 of the control valve 7 is placed at the second position where the first valve portion 77x closes the confluence port 74, the second valve port 72 is opened. Accordingly, the second valve port 72 and the return port 73 are kept to be communicated with each other. As a result, if the temperature of the hydraulic oil is low and the hydraulic-oil pressure is excessive, it is possible to avoid the breakage of the pump body 1a and the rotor 2, which stems from the excessive hydraulic-oil pressure.

In the modified version shown in FIG. 7, the displacement distance of the spool 77 is regulated by the projection 80h of the plug 80. Note that, however, it is possible to effect the same advantage without providing the plug 80. For example, in the control valve 7 of the First Preferred Embodiment, the pitch of the coiled springs 79 can be adjusted so that the neighboring coils constituting the spring 79 are brought into close contact with each other before the first valve portion 77x closes the second valve port 72.

In the above-described First Preferred Embodiment, the outlet port array 33 is constituted by one main outlet port 31 and one sub outlet port 32. However, the present oil pump system is not limited to this arrangement. For instance, in the outlet port array arrangement, the number of the sub outlet port 32 is not limited to one; namely: an outlet port array can be constituted by one main outlet port 31, one first sub outlet port and one second sub outlet port.

In a modified version of the present oil pump system whose outlet port array is constructed as above, the hydraulic pressure of the hydraulic oil discharged out of the main outlet port 31 likewise actuates the spool 77 of the control valve 7. However, in this modified version, two of the hydraulic-oil flows (e.g., the hydraulic-oil flow coming from the main outlet port 31 and the hydraulic-oil flow coming from the first sub outlet port) can be joined together, or three of the hydraulic-oil flows (e.g., the hydraulic-oil flow coming from the main outlet port 31, the hydraulic-oil flow coming from the first sub outlet port and the hydraulic-oil flow coming from the second sub outlet port) can be joined together.

Figure 8:
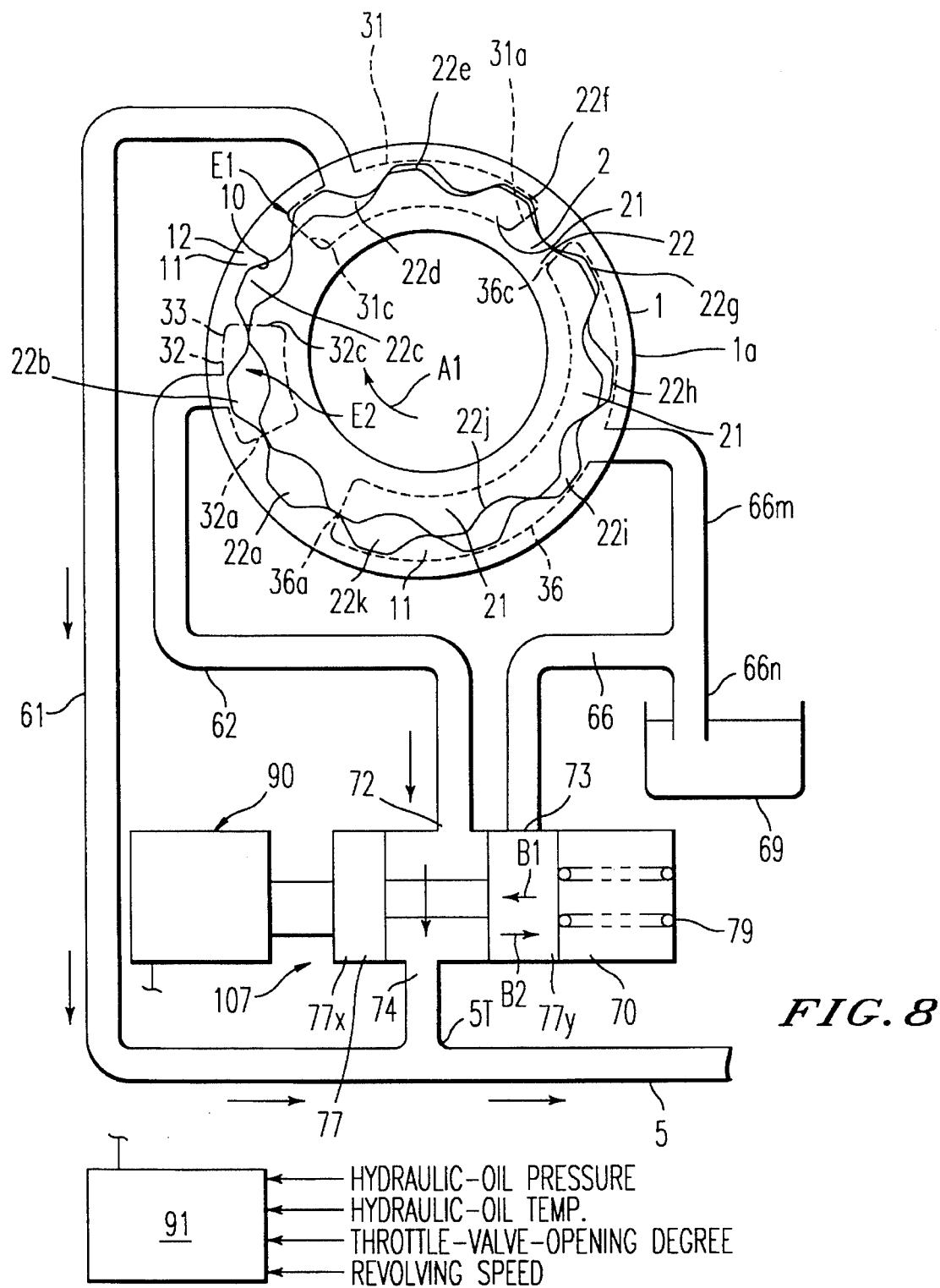
FIG. 8 illustrates an arrangement of another modified version of the First Preferred Embodiment of the present oil pump system.
Figure 10:
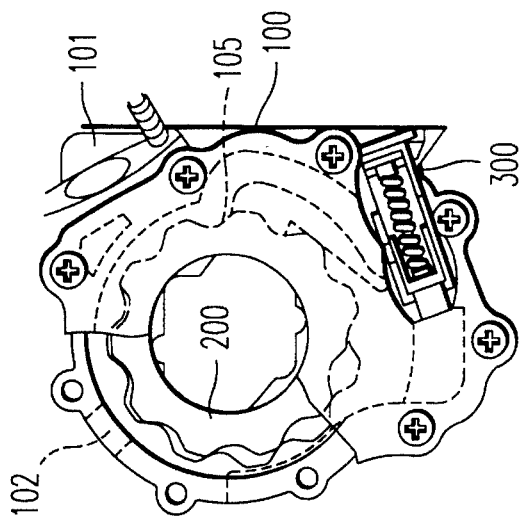
FIG. 10 illustrates a rough arrangement of a conventional oil pump system.
Figure 9:
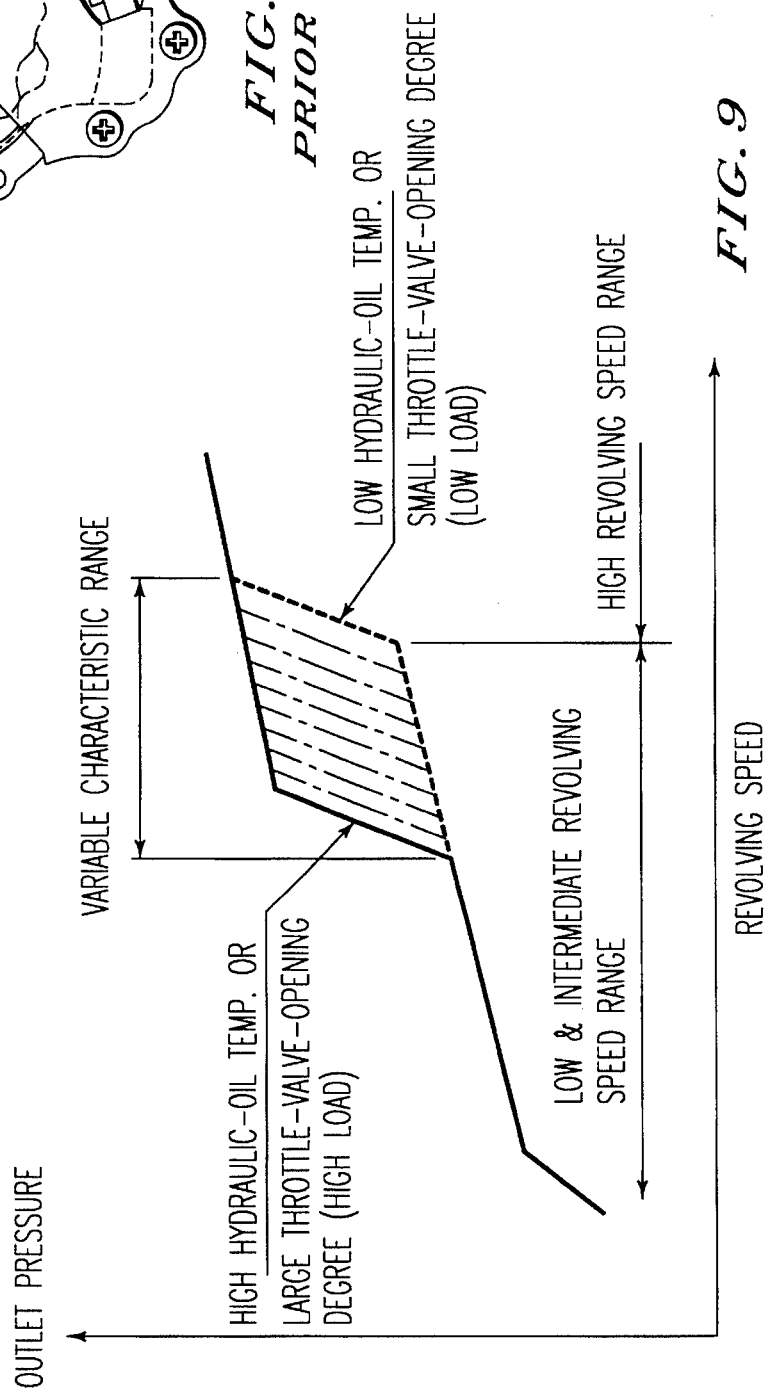
FIG. 9 illustrates an outlet-pressure characteristic, which is exhibited by the another modified version.

FIGS. 8 and 9 illustrate another modified version of the present oil pump system. In this modified version, a control valve 107 is actuated by known proportional electromagnetic control means 90. The proportional electromagnetic control means 90 is controlled by output signals, which are outputted by an electric control device 91 in responsive to a hydraulic-oil pressure in the first hydraulic passage 61, a hydraulic-oil temperature, an opening degree of a throttle valve, and a revolving speed of the internal combustion engine.

Other than the proportional electromagnetic control means 90, the electric control device 91 and the control valve 107, this modified version is constructed basically in the same manner as the First Preferred Embodiment illustrated in FIG. 1. Therefore, the component elements functioning similarly are designated at the same reference numerals, and will not be detailed herein.

In this modified version, the electric control device 91 detects the hydraulic-oil pressure in the first hydraulic passage 61, the hydraulic-oil temperature, the opening degree of a throttle valve, and the revolving speed of the internal combustion engine directly or indirectly, and outputs the valve-actuating signals in responsive to the thus detected signals. The control valve 107 is actuated in accordance with the valve-actuating signals so that the present oil pump system exhibits the outlet-pressure characteristic shown in FIG. 9.

The outlet-pressure characteristic shown in FIG. 9 is substantially identical with the one shown in FIG. 6. In this modified version, depending on the loads to the internal combustion engine, an optimum outlet pressure (or outlet amount) can be established by electromagnetic control. Hence, this modified version is inhibited from producing a waste work.

Having now fully described the present invention, it will be apparent to one of ordinary skill in the art that many changes and modifications can be made thereto without departing from the spirit or scope of the present invention as set forth herein including the appended claims.

In particular, the present oil pump system is not limited to the First Preferred Embodiment and the modified version thereof which have been described so far and which are illustrated in the accompanied drawings. For example, the predetermined hydraulic pressure value Pm can be hardly limited to the aforementioned value. The present oil pump system can be applied to oil pump systems which are adapted for a lot of industrial equipment other than vehicle. Further, the oil pump cannot necessarily be the trochoid-type oil pump 1. Furthermore, the oil pump 1 can be driven by driving sources other than the directly-connected crankshaft mechanism, for instance, it can be driven by pulleys and a timing belt.

What is claimed is:

1. An oil pump system, comprising:

an oil pump including:
    a pump body defining a pump chamber therein;
    a rotor rotated by a driving source in the pump body;
    an inlet port sucking a hydraulic oil into the pump chamber as the rotor rotates; and
    an outlet port array having a first outlet port and a second outlet port at least, the first and second outlet ports discharging the hydraulic oil out of the pump chamber as the rotor rotates;

a first hydraulic passage connecting a hydraulic-oil-delivery passage with the first outlet port of said oil pump, and delivering the hydraulic oil, coming from the first outlet port, to the hydraulic-oil-delivery passage, the hydraulic-oil-delivery passage delivering the hydraulic oil to a hydraulic oil receiving unit;

a second hydraulic passage connecting the hydraulic-oil-delivery passage with the second outlet port of said oil pump, and delivering the hydraulic oil, coming from the second outlet port, to the hydraulic-oil-delivery passage; and a return hydraulic passage connected to said second hydraulic passage, and communicated with the inlet port of said oil pump; and a control valve connected to said first hydraulic passage, said second hydraulic passage and said return hydraulic passage, the control valve including a valve body actuated in accordance with a hydraulic pressure of the hydraulic oil within said first hydraulic passage, and the control valve being capable of switching the valve body between a first position and a second position;

the first position joining said first hydraulic passage and said second hydraulic passage so as to join the hydraulic oil flowing in both of them, and delivering the joined hydraulic oil to the hydraulic-oil-delivery passage when the hydraulic pressure in said first hydraulic passage is lower than a predetermined value;

the second position preventing said first hydraulic passage and said second hydraulic passage from joining, delivering the hydraulic oil flowing in said first hydraulic passage to the hydraulic-oil-delivery passage, and returning the hydraulic oil flowing in said second hydraulic passage to said return hydraulic passage when the hydraulic pressure in said first hydraulic passage is higher than the predetermined value.

2. The oil pump system according to claim 1, wherein the rotor of said oil pump is rotated in a low revolving speed range when the valve body of said control valve is placed at the first position, and is rotated in a high revolving speed range when the valve body of said control valve is placed at the second position.

3. The oil pump system according to claim 1, wherein said first hydraulic passage is communicated with said second hydraulic passage by way of said control valve.

4. The oil pump system according to claim 1, wherein said return hydraulic passage is connected to said second hydraulic passage by way of said control valve.

5. The oil pump system according to claim 1, wherein said return hydraulic passage is communicated with the inlet port of said oil pump directly.

6. The oil pump system according to claim 1, wherein said return hydraulic passage is communicated with the inlet port of said oil pump by way of a hydraulic oil storing unit.

7. The oil pump system according to claim 1, wherein the first outlet port of said oil pump is disposed downstream with respect to the second outlet port thereof in a rotary direction of the rotor thereof.

8. The oil pump system according to claim 1, wherein the first outlet port of said oil pump has an opening area which is larger than that of the second outlet port thereof.

9. The oil pump system according to claim 1, wherein said first hydraulic passage further includes an intermediate hydraulic passage which is branched therefrom and connected to said control valve; and said control valve further includes a first valve port communicated with the first hydraulic passage by way of the intermediate hydraulic passage, a second valve port communicated with said second hydraulic passage, a return port communicated with said return hydraulic passage, and a confluence port communicated with said first hydraulic passage, which is disposed downstream with respect to the intermediate hydraulic passage, as well as with the second valve port.

10. The oil pump system according to claim 9, wherein said control valve further includes a valve body having a first valve portion and a second valve portion, and urging means for urging the valve body so as to close the first valve port with the first valve portion thereof;

the first valve portion closing the first valve port but communicating the second valve port with the confluence port when the valve body is placed at the first position, and closing the confluence port when the valve body is placed at the second position;

the second valve portion closing the return valve port when the valve body is placed at the first position; and the valve body communicates the second valve port and the return port when it is placed at the second position.

11. The oil pump system according to claim 1, wherein the pump body of said oil pump includes a plurality of internal gear teeth which are defined by a trochoid curve; and the rotor thereof includes a plurality of external gear teeth which mesh with the internal gear teeth of the pump body and which are defined by a trochoid curve, and is rotated by means of a crankshaft of an internal combustion engine.

12. The oil pump system according to claim 11, wherein a point of contact between the internal gear teeth of the pump body and the external gear teeth of the rotor is disposed at a place between the first outlet port and the second outlet port, thereby discommunicating the first outlet port with the second outlet port in a rotary direction of the rotor of said oil pump.

13. An oil pump system, comprising:

an oil pump including:

a pump body defining a pump chamber therein;

a rotor rotated by a driving source in the pump body;

an inlet port sucking a hydraulic oil into the pump chamber as the rotor rotates; and an outlet port array having a first outlet port and a second outlet port at least, the first and second outlet ports discharging the hydraulic oil out of the pump chamber as the rotor rotates;

a first hydraulic passage connecting a hydraulic-oil-delivery passage with the first outlet port of said oil pump, and delivering the hydraulic oil, coming from the first outlet port, to the hydraulic-oil-delivery passage, the hydraulic-oil-delivery passage delivering the hydraulic oil to a hydraulic oil receiving unit;

a second hydraulic passage connecting the hydraulic-oil-delivery passage with the second outlet port of said oil pump, and delivering the hydraulic oil, coming from the second outlet port, to the hydraulic-oil-delivery passage; and a return hydraulic passage connected to said second hydraulic passage, and communicated with the inlet port of said oil pump;

control means for outputting a control signal in responsive to at least one or a hydraulic-oil pressure in said first hydraulic passage, a hydraulic-oil temperature, an opening degree of a throttle valve, and a revolving speed of the driving source; and a control valve connected to said first hydraulic passage, said second hydraulic passage and said return hydraulic passage, the control valve including a valve body actuated in accordance with the control signal outputted by said control means, and the control valve being capable of switching the valve body between a first position and a second position;

the first position joining said first hydraulic passage and said second hydraulic passage so as to join the hydraulic oil flowing in both of them, and delivering the joined hydraulic oil to the hydraulic-oil-delivery passage when the hydraulic pressure in said first hydraulic passage is lower than a predetermined value;

the second position preventing said first hydraulic passage and said second hydraulic passage from joining, delivering the hydraulic oil flowing in said first hydraulic passage to the hydraulic-oil-delivery passage, and returning the hydraulic oil flowing in said second hydraulic passage to said return hydraulic passage when the hydraulic pressure in said first hydraulic passage is higher than the predetermined value.

* * * * *